M. W. DAVISON, G. KESTER & J. M. ROWAN.
DEVICE FOR TEMPERING GLASS.
APPLICATION FILED APR. 8, 1911.
1,000,671.  Patented Aug. 15, 1911.
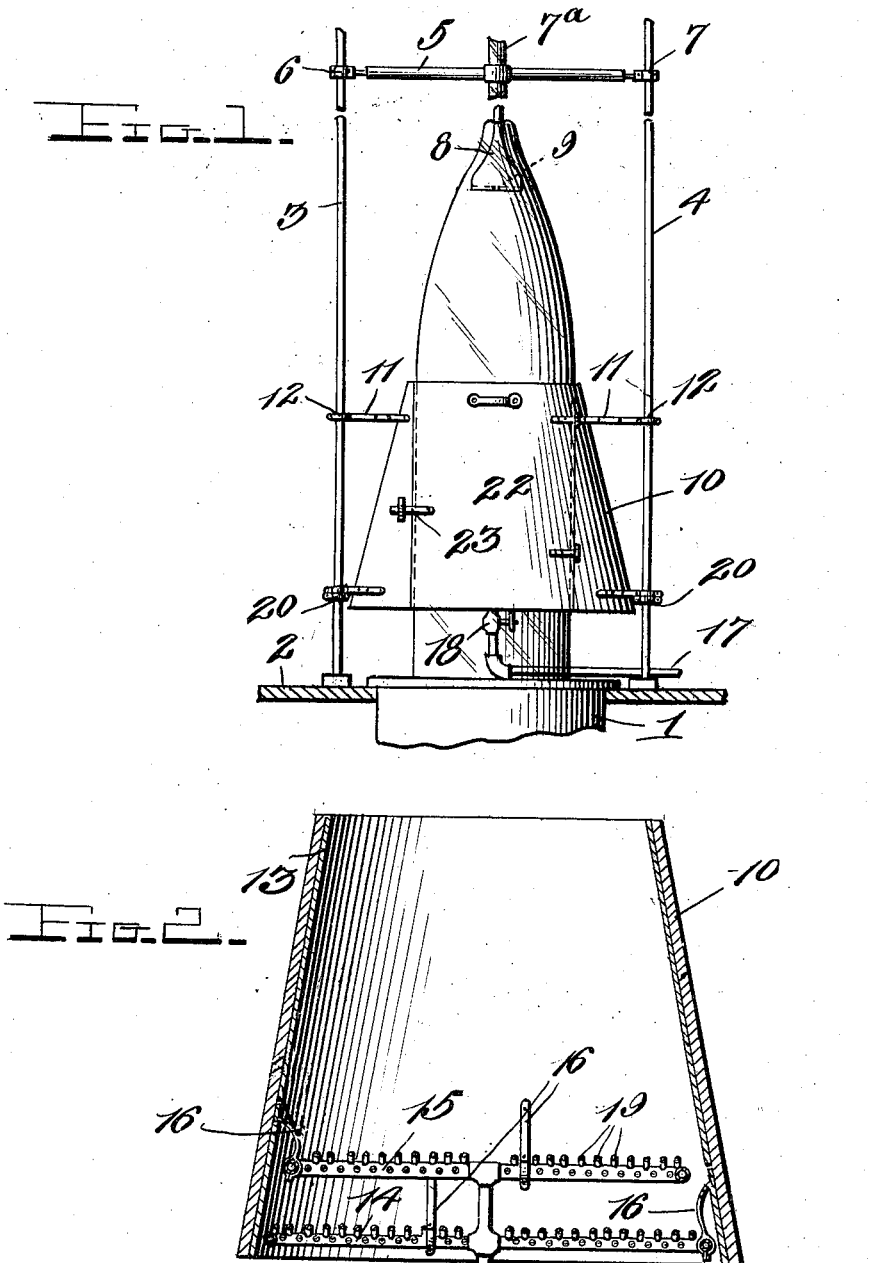
Witnesses
Chas. L. Griesbauer.
L. G. Ellis.
Inventors
M. W. Davison,
G. Kester and
J. M. Rowan,
By Watson E. Coleman.
Attorney

UNITED STATES PATENT OFFICE.

MATTHEW W. DAVISON, GEORGE KESTER, AND JAMES M. ROWAN, OF DUBOIS, PENNSYLVANIA.

DEVICE FOR TEMPERING GLASS.

1,000,671. Specification of Letters Patent. Patented Aug. 15, 1911.

Application filed April 8, 1911. Serial No. 619,836.

*To all whom it may concern:*

Be it known that we, MATTHEW W. DAVISON, GEORGE KESTER, and JAMES M. ROWAN, citizens of the United States, residing at Dubois, in the county of Clearfield and State of Pennsylvania, have invented certain new and useful Improvements in Devices for Tempering Glass, of which the following is a specification, reference being had to the accompanying drawings.

Our invention relates to certain new and useful improvements in the manufacturing of glass and more particularly to a tempering device used in the manufacture of machine-made glass, and our object is to provide a device that will temper glass as it is being drawn and blown, so as to be of a quality, when finished, equal to glass made by hand.

A further object of the invention resides in providing a tubular casing of frusto-conical design lined with asbestos and capable of vertical movement.

A still further object of the invention resides in providing the tubular casing with circular burners within the same and also providing the same with a door.

A still further object resides in providing a device which is simple in construction, inexpensive to manufacture and extremely effective in operation.

With these and other objects in view, our invention consists in the novel features of construction, combination and arrangement of parts as will be hereinafter referred to and more particularly pointed out in the specification and claims.

In the accompanying drawing forming a part of this application, Figure 1 is a side elevation of the device applied to use, and, Fig. 2 is a vertical section through the casing.

In carrying out our invention, we shall refer to the drawing in which similar reference characters designate corresponding parts throughout the several views and in which—

1 indicates a receptacle for containing glass in liquid or semi-liquid state, which receptacle is adapted to be inserted in an opening in the ground or floor 2, and extending vertically upward from said floor or ground 2 on opposite sides of said receptacle, are the standards or guide rods 3 and 4. Extending transversely of the guide rods 3 and 4 is a bar 5, the outer ends of which have secured thereto, the ring members 6 and 7 which are slidably engaged, respectively, with said rods 3 and 4, and extending through said bar about centrally thereof, is a blow pipe 7ª. Said blow pipe is held to the bar in any desired manner, so that when said bar is raised or lowered, said pipe will likewise be raised or lowered therewith, and the lower end of said pipe is provided with the usual or any preferred form of gatherer 8 having the air exit opening 9 therein, and it will be seen that as said gatherer is dipped within the receptacle 1 containing the liquid glass, and said gatherer drawn upwardly, said liquid glass will be drawn therewith and the blowing of the air through the pipe 7ª and opening 9 will blow the glass into the usual rolled form.

It is a well known fact that the quality of machine-made glass is far below that of hand-made glass, this being true mainly because machine glass is more brittle and more easily broken, but this defect is due to the lack of an effective tempering device. Numerous attempts have been made toward the improvement of the conditions in tempering machine-made glass, but all have failed practically, and to this extent, we provide an improved means which comprises a tubular casing 10 of frusto-conical design, said casing being provided adjacent its upper and lower ends with the laterally extending straps or hangers 11, said straps having their outer ends secured to clamping members 12 which are in turn slidably engaged with the guide rods 3 and 4. Said tubular casing 10 has the inner wall thereof provided with a lining of asbestos 13 and has mounted therewithin adjacent the lower end thereof, the tubular gas burners 14 and 15. These burners are secured to the inner wall of said casing by means of the clamping members 16, and although we have shown two burners 14 and 15 in conjunction with said casing, it will be understood that one or more than two may be provided, as desired, without departing from the spirit of the invention. Said burners are supplied with gas from a main pipe 17 through the medium of a valve 18, and said burners are provided with a plurality of jets 19, so closely disposed as to form a continuous flame throughout the circular burners when the gas flowing therefrom is ignited. As before stated, the clamping members 12 retaining said casing in position, are slidably engaged with the rods 3 and 4, and the stops 20 carried on said rods adjacent the lower ends thereof are adapted to limit the downward movement of said casing thereon so as to be disposed a slight distance above the receptacle 1.

For the raising and lowering of the tubular casing 10 on the guide rod 3, whenever occasion should require, any preferred means may be provided, and said casing is provided on one side thereof with a door 22 which extends the full height of said casing. This door is hingedly mounted on the casing and may be retained in its closed or locked position by means of a latch 23, and when it is desired to move the roll of glass from the blow pipe, said door may be opened and the roll passed therethrough without interferring with said casing.

The casing being of frusto-conical design, will naturally have the lower end thereof of larger diameter than the diameter of the receptacle 1, and the tubular circular burners being mounted within said casing in the lower end thereof, will doubtless be of greater diameter than said receptacle, so that as the gatherer is drawn upwardly from the receptacle, the glass drawn therewith will be passed through the burners, as usual. The casing being designed frusto-conical, however, lined with asbestos, will retain considerable heat therewithin so that the roll of glass will be heated throughout the length of said casing, which will properly temper said glass.

It is, of course, essential to have the heat greatest at the lower end of said casing and in numerous devices heretofore used for the tempering of machine-made glass, there has been provided no means for retaining the heat in any device through which the roll of glass is adapted to be passed, so that as soon as the glass passes the zone of greatest heat, it becomes quickly cooled and is, therefore, brought out in a brittle state. In our device, however, it will doubtless be seen that the zones of heat will be graduated, so that the greatest heat will be at the lower end, the design of the casing and the lining thereof with asbestos causing the heat to remain throughout the length thereof and the zone of least heat at the upper end, and in this manner, glass may be turned out in a state of flexibility equal to that of hand-made glass.

From the foregoing, it will be seen that we have provided a simple and economical device for the tempering of machine-made glass which will be extremely effective in operation.

What we claim is:—

1. In the manufacture of glass, the combination with a receptacle and a gatherer; of a casing disposed above said receptacle through which said gatherer is adapted to be drawn, whereby said casing may be raised and lowered, and means to retain the same in any adjusted position.

2. In the manufacture of glass, the combination with a receptacle and a gatherer; of a tubular casing slidably mounted above said receptacle through which said gatherer is adapted to be drawn, said casing being lined with a heat-retaining material, and a burner mounted in the lower portion of said casing.

3. In the manufacture of glass, the combination with a receptacle and a gatherer; of a tubular casing of frusto-conical design, said casing being slidably mounted above said receptacle and lined with a heat-retaining material, and a burner mounted in the lower portion of said casing.

4. In the manufacture of glass, the combination with a receptacle and a gatherer; of a tubular casing of frusto-conical design and having the inner wall thereof lined with a heat-retaining material, guide rods, means to slidably mount said casing on said guide rods, and a burner mounted in the lower portion of said casing.

5. In the manufacture of glass, the combination with a receptacle and gatherer; of a pair of guide rods, means to slidably mount said gatherer between said guide rods, a tubular casing also slidably mounted between said guide rods, said casing having the inner wall thereof lined with a heat-retaining material, means to limit the downward movement of said casing on said rods, and a burner mounted in the lower portion of said casing.

6. In the manufacture of glass, the combination with a receptacle and a gatherer; of a tubular casing of frusto-conical design, said casing being slidably mounted above said receptacle and having the inner wall thereof lined with a heat-retaining material, said casing also having a door formed in the wall thereof, and a burner mounted in the lower portion of said casing.

7. In the manufacture of glass, the combination with a receptacle and gatherer; of a pair of vertical guide rods disposed on opposite sides of said receptacle, means to slidably mount said gatherer between said rods, a tubular casing also slidably mounted on said rods, means to limit the downward movement of said casing thereon, said casing being of frusto-conical design and having the inner wall thereof lined with a heat-retaining material, and a burner mounted in the lower portion of said casing.

In testimony whereof we hereunto affix our signatures in the presence of two witnesses.

MATTHEW W. DAVISON.
GEORGE KESTER.
JAMES M. ROWAN.

Witnesses:
JOHN BUGGEY,
PAT WALTERS.